United States Patent
Allen et al.

(10) Patent No.: US 10,437,835 B2
(45) Date of Patent: *Oct. 8, 2019

(54) SCORING ATTRIBUTES IN A DEEP QUESTION ANSWERING SYSTEM BASED ON SYNTACTIC OR SEMANTIC GUIDELINES

(71) Applicant: International Business Machines Corporation, Armonk, NY (US)

(72) Inventors: Corville O. Allen, Morrisville, NC (US); Roberto Delima, Apex, NC (US); Thomas J. Eggebraaten, Rochester, MN (US); Marie L. Setnes, Bloomington, MN (US)

(73) Assignee: International Business Machines Corporation, Armonk, NY (US)

( * ) Notice: Subject to any disclaimer, the term of this patent is extended or adjusted under 35 U.S.C. 154(b) by 742 days.

This patent is subject to a terminal disclaimer.

(21) Appl. No.: 14/575,526

(22) Filed: Dec. 18, 2014

(65) Prior Publication Data

US 2016/0179944 A1    Jun. 23, 2016

(51) Int. Cl.
*G06E 1/00*   (2006.01)
*G06E 3/00*   (2006.01)
(Continued)

(52) U.S. Cl.
CPC .... *G06F 16/24578* (2019.01); *G06F 16/3329* (2019.01); *G06F 16/36* (2019.01); *G06F 16/9535* (2019.01); *G06N 5/022* (2013.01)

(58) Field of Classification Search
CPC ........ G06N 99/005; G06N 5/04; G06N 5/022; G06F 17/3053; G06F 17/3065;
(Continued)

(56) References Cited

U.S. PATENT DOCUMENTS 5,978,785 A * 11/1999 Johnson .................. G06N 5/04
                                                              706/54
7,822,699 B2  10/2010 Katariya et al.
(Continued)

FOREIGN PATENT DOCUMENTS

EP    1944705 A2    7/2008

OTHER PUBLICATIONS

Kanani, Pallika, and Prem Melville. "Prediction-time active feature-value acquisition for cost-effective customer targeting." Advances In Neural Information Processing Systems (NIPS) (2008).*
(Continued)

*Primary Examiner* — Luis A Sitiriche
(74) *Attorney, Agent, or Firm* — Patterson + Sheridan, LLP

(57) ABSTRACT

Systems and computer program products to, responsive to receiving a case by a deep question answering (deep QA) system, identify, in a corpus of information, a first variable for which a value was not specified in the case, compute an importance score for the first variable based on a concept in the corpus, wherein the concept is associated with the first variable, and upon determining that the importance score exceeds an importance threshold, determine that specifying a value for the first variable increases a confidence score of a response returned by the deep QA system beyond a confidence threshold.

9 Claims, 4 Drawing Sheets

(51) Int. Cl.
  *G06F 15/18* (2006.01)
  *G06G 7/00* (2006.01)
  *G06N 3/02* (2006.01)
  *G06F 16/2457* (2019.01)
  *G06F 16/36* (2019.01)
  *G06F 16/332* (2019.01)
  *G06F 16/9535* (2019.01)
  *G06N 5/02* (2006.01)

(58) Field of Classification Search
  CPC ......... G06F 17/30731; G06F 17/30675; G06F 17/30345; G06F 17/30654; G06F 17/30867; G01N 2800/042; G01N 2800/044; G01N 33/6893
  See application file for complete search history.

(56) References Cited

U.S. PATENT DOCUMENTS

| | | | |
|---|---|---|---|
| 8,392,816 | B2 | 3/2013 | Radakovic et al. |
| 8,620,927 | B2* | 12/2013 | Jonas ................. G06F 17/30303 707/748 |
| 8,762,302 | B1 | 6/2014 | Spivack et al. |
| 2008/0195589 | A1 | 8/2008 | Guo et al. |
| 2009/0222400 | A1* | 9/2009 | Kupershmidt ....... G06N 99/005 706/52 |
| 2014/0164303 | A1* | 6/2014 | Bagchi .................... G06N 5/02 706/46 |
| 2014/0185937 | A1 | 7/2014 | Brown et al. |
| 2014/0309990 | A1 | 10/2014 | Gandrabur et al. |
| 2014/0324434 | A1 | 10/2014 | Vozila et al. |
| 2015/0032443 | A1* | 1/2015 | Karov ................. G06F 17/2785 704/9 |
| 2015/0235131 | A1* | 8/2015 | Allen ................ G06F 17/30654 706/48 |
| 2015/0317389 | A1* | 11/2015 | Hua ................. G06F 17/30705 706/12 |

OTHER PUBLICATIONS

Kalyanpur, Aditya, et al. "Structured data and inference in DeepQA." IBM Journal of Research and Development 56.3.4 (2012): 10-1.*

CMPT 125: Lecture 1: Understanding the Computer Tamara Smyth, tamaras@cs.sfu.ca School of Computing Science (Year: 2009).*

Dave et al., "Mining the Peanut Gallery: Opinion Extraction and Semantic Classification of Product Reviews," WWW2003, May 20-24, 2003, Budapest, Hungary. ACM 1-58113-680-3/03/0005.

Cormode et al., "Semantics of Ranking Queries for Probabilistic Data and Expected Ranks," IEEE International Conference on Data Engineering, 2009, DOI 10.1109/ICDE.2009.75.

Allen et al., "Scoring Attributes in a Deep Question Answering System Based on Syntactic or Semantic Guidelines", U.S. Appl. No. 14/862,287, filed Sep. 23, 2015.

IBM "List of IBM Patents or Patent Applications Treated As Related".

* cited by examiner

SCORING ATTRIBUTES IN A DEEP QUESTION ANSWERING SYSTEM BASED ON SYNTACTIC OR SEMANTIC GUIDELINES

BACKGROUND

The present disclosure relates to deep question answering systems, and more specifically, to scoring attributes in a deep question answering system based on syntactic or semantic guidelines.

Deep question answering (deep QA) systems receive cases (also referred to as questions) from users. The deep QA systems receive cases from users which include different data elements. The deep QA systems leverage corpora of information to process the cases in an execution pipeline, returning a set of candidate answers as responsive to the cases. Often, however, users do not provide information needed by the deep QA system to generate the most correct response (or answer) to the case. Even without this information, the deep QA system is expected to give a reasonable response to the case.

SUMMARY

Embodiments disclosed herein include systems and computer program products to, responsive to receiving a case by a deep question answering (deep QA) system, identify, in a corpus of information, a first variable for which a value was not specified in the case, compute an importance score for the first variable based on a concept in the corpus, wherein the concept is associated with the first variable, and upon determining that the importance score exceeds an importance threshold, determine that specifying a value for the first variable increases a confidence score of a response returned by the deep QA system beyond a confidence threshold.

DETAILED DESCRIPTION

Figure 1:
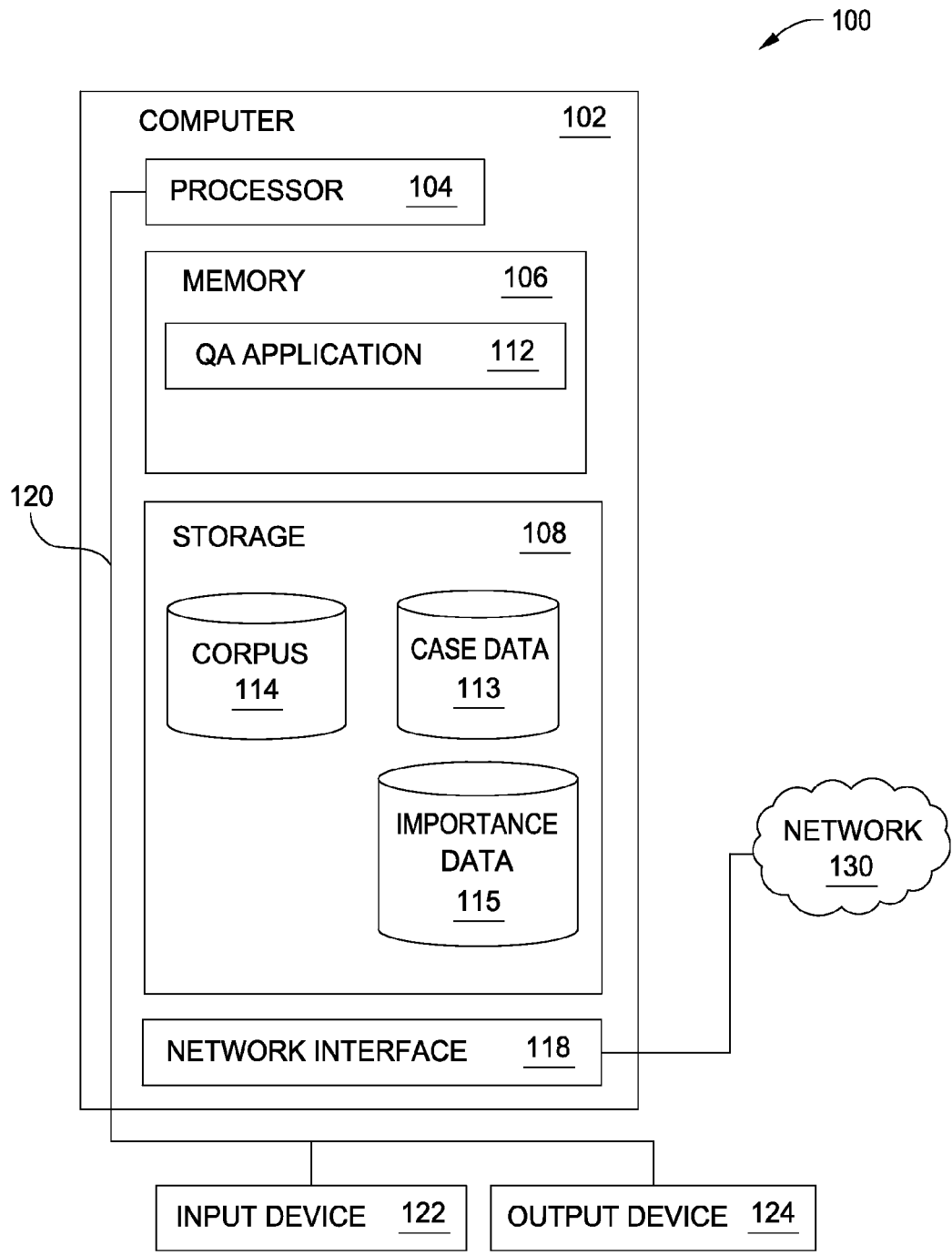
FIG. 1 illustrates a system which scores attributes in a deep question answering system based on syntactic and semantic guidelines, according to one embodiment.

Embodiments disclosed herein provide a deep question answering system (deep QA system) configured to identify attributes in a corpus of information important to answering cases received from users. That is, the deep QA system can evaluate a corpus of information to learn what attributes matter for a class of cases. Similarly, the deep QA system can identify attributes for a specific case (of the class of cases) based on the values of attributes in that case. That is, the deep QA system may learn relationships between different attributes from the corpus (or relationships between values of attributes in those cases) that can significantly impact the correctness of an answer. If a user submits a case that lacks one of the identified attributes, the deep QA system may prompt the user to provide a value for the attribute. Before doing so, the deep QA system may determine a measure of how important the missing attribute is to answering that particular case. In at least one embodiment, the deep QA system may group attributes (also referred to as information, variables, and the like) into different categories based on concepts in the corpus associated with the attribute. The deep QA system may then compute a score for the attribute representing a measure of importance for that attribute relative to groups which have that attribute as a member. The attribute score may then be compared to a range (or threshold) to determine a measure of importance. If the score indicates that the attribute is of sufficient importance, the deep QA system may prompt for a value for the attribute. The deep QA system may use this value to process the case to determine an answer with a higher confidence score than a response returned without knowing the value for the attribute.

For example, a physician may submit a case to the deep QA system requesting recommended treatments for a patient. The deep QA system may then identify, in a corpus of information, a use-label for a particular drug to identify sections that reference dosage reductions, cautions, and contraindications. The deep QA system may analyze statements in these sections that could affect the correctness of a response generated by the QA system. For example, a dosage reduction section could specify that the dosage should be reduced in patients having an allergy to the drug. Similarly, another statement in the drug label could indicate that caution should be used in prescribing the drug to patients over a certain age. Further still, the drug label could state a contraindication to the drug for patients having creatinine clearances less than a specified amount. In each instance, the deep QA system may analyze statements in the drug label to identify the related concepts (caution, dosage reduction, and contraindication) as well as the attributes associated with each concept (age, allergy, and creatinine levels, respectively). The deep QA system may then generate an importance score for each of these attributes. If the importance score exceeds a threshold, the deep QA system may prompt a user to provide values for these attributes when a case is received that does not specify values for these attributes.

Although the medical field is used herein a reference example, embodiments disclosed herein may be adapted for cases (and corpus of information) related to a variety of topics. More generally, deep question answering systems use the techniques disclosed herein to identify important attributes for questions or cases in any domain where the correctness of an answer or recommendation produced by the QA system can be improvised by identifying attributes missing from a case or question that can significantly improve the correctness of such an answer or recommendation.

FIG. 1 illustrates a system 100 which scores attributes in a deep question answering system based on syntactic and semantic guidelines, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory and storage systems on other systems coupled to the computer 102.

The input device 122 represents keyboards, mice, controllers, and so on. The output device 124 represents monitors, touch screen displays, and so on.

As shown, the storage 108 includes a case data 113, a corpus 114, and an importance data 115. The case data 113 includes data related to the case submitted by a user. For example, in a medical setting, the case data 113 may include a patient's medical history, and any other data regarding the patient. The corpus 114 is a body of information used by the QA application 112 to generate answers to cases. For example, the corpus 114 may contain scholarly articles, dictionary definitions, encyclopedia references, product descriptions, web pages, and the like. The importance data 115 includes, without limitation, attributes identified in the corpus 114 and any associated importance scores computed by the QA application 112, importance levels, and threshold values (or ranges) for importance scores.

As shown, the memory 106 contains a QA application 112, which is an application generally configured to provide a deep question answering (QA) system. One example of a deep question answering system is Watson, by the IBM Corporation of Armonk, NY. A user may submit a case (also referred to as a question) to the QA application 112. The QA application 112 will then provide an answer to the case based on an analysis of a corpus of information 114. Although depicted as executing on a single computer, the functionality of the QA application 112 may be provided by grid or cluster of computers (not pictured), and the QA application 112 may serve as a frontend to orchestrate such distributed functionality.

The QA application 112 is trained to generate responses to cases during a training phase. During the training phase, the QA application 112 is trained to answer cases using an "answer sheet" which predefines the most correct responses. During training, the QA application 112 ingests content in the corpus 114 to produce one or more machine learning models (not pictured). In addition, during the training phase, the QA application 112 is configured to identify data attributes which are important to answering cases (namely, those attributes having an impact on the confidence score of a given answer).

After being trained, the QA application 112 may process user cases through a runtime analysis pipeline. In at least one embodiment, the case data 113 include medical records of a patient, and the candidate answers returned by the QA application 112 correspond to a set of recommended treatments, ranked by a confidence score of each respective candidate answer. The analysis pipeline executes a collection of analysis programs to evaluate both the question text and candidate answers (i.e., text passages extracted from documents in a corpus 114) in order to construct the most probable correct answer, based on the information extracted from the corpus and from the question. A typical execution pipeline may begin with question analysis, which analyzes and annotates each question presented in the case to identify key topics, concepts, and attributes for conducting a search. The next step of the pipeline may include a primary search, which involves searching for documents in the corpus 114 using the key attributes from the question analysis phase. The next step of the pipeline may generate candidate answers. For example, the QA application 112 may identify key matching passages (based on, for example, topics, concepts, and/or string matching) from the search results with passages in the candidate answers. In the next step of the pipeline, the QA application 112 may then retrieve supporting evidence for the candidate answers. The QA application 112 may then complete the pipeline by scoring the various candidate answers, from which the most correct answer identified by the QA application 112 may returned to the user.

The QA application 112 also identifies data attributes in the corpus 114 that may significantly impact the correctness of responses to cases submitted by users. In one embodiment, the QA application 112 may identify such data attributes based on both syntactic features and semantic meaning of references or discussion about the attributes within the documents of the corpus 114. The QA application 112 may then compute a score measuring the relative importance of the attributes for the class of cases represented by the corpus. That is, the QA application 112 may surface those data attributes of particular importance to the correctness of an answer for a given class of cases, or attributes in combination. For example, attribute X may only be critical in view of attribute Y being present, or of a specific value. The QA application 112 may learn such relationships of relative importance from the corpus 114 and apply the relationships to evaluate the attributes supplied in a case to improve the correctness an answer. If a case does not include attributes identified as being of importance to providing a response to the case, the QA application 112 may return a response to the case, along with an indication of any missing attributes that could improve the correctness of the answer. Further, the QA application 112 could also prompt the user to provide a value for the attributes in order to reprocess the case. Once the user provides values for the requested attributes, the QA application 112 may re-process the question and return an answer with higher confidence scores. In one embodiment, the QA application 112 may identify important data attributes when processing a case. In another embodiment, the QA application 112 may identify important data attributes as part of a training phase where the QA application 112 determines the importance of each attribute.

For example, the QA application 112 may receive a case that does not specify a patient's creatinine levels. In generating treatments the QA application 112 may identify a first drug as a candidate treatment for the patient. The QA application 112 may then scan a corpus of information to find statements regarding the first drug and identify a use-label for the first drug (or other relevant documents describing the first drug). Assume the use-label states that "treatment is contraindicated if creatinine clearance is less than 35 ml/min." The QA application 112 may evaluate the label using natural language processing (NLP) to identify concepts. Specifically, the QA application 112 could identify the "contraindication" statement as a concept related to the creatinine clearance (an attribute) of the patient. In one embodiment, the QA application 112 may have predefined concept categories for these concepts and attributes for a set of cases. Concepts may also be learned when ingesting a corpus 114. The concept categories may be stored in the importance data 115. For example, in a medical setting, the concept categories in the importance data 115 may include "contraindications," "cautions," and "warnings." The QA application 112 may then determine that the patient's creatinine levels, based on the NLP processing of the drug label, are in the "contraindication" category.

The QA application 112 may then compute an importance score for creatinine levels, stored in the importance data 115. The importance score may be based on any factors, such as the syntactic and semantic meanings references to creatinine levels in the corpus, frequency by which the creatinine levels occur in the corpus (and/or a given document), an authority of the document mentioning the creatinine levels, which section of the document the creatinine levels are mentioned, and/or the category the creatinine levels are placed in (such as the contraindication, warning, or caution categories). If the score for creatinine levels exceeds an importance threshold, the QA application 112 may determine that the creatinine levels are of critical importance, and prompt the user to provide a value for the patient's creatinine levels if processing a case that lacked such information. The QA application 112 may define importance scores in qualitative terms, such as "critical," "important," and "useful," and quantitative terms, e.g., ranges from 7.1-10, 4.1-7.0, and 0-4.0, respectively. Assuming the importance score of creatinine is sufficiently high to the confidence in the correctness of a response generated for a given case, the QA application 112 may determine that the patient's creatinine levels are of critical importance, and request the creatinine levels from the user (likely the patient's physician). Doing so may allow the QA application 112 to re-process the case using this piece of critical information, such that the QA application 112 does not recommend prescription of the first drug to patients having creatinine levels that are not appropriate for the treatment.

Figure 2:
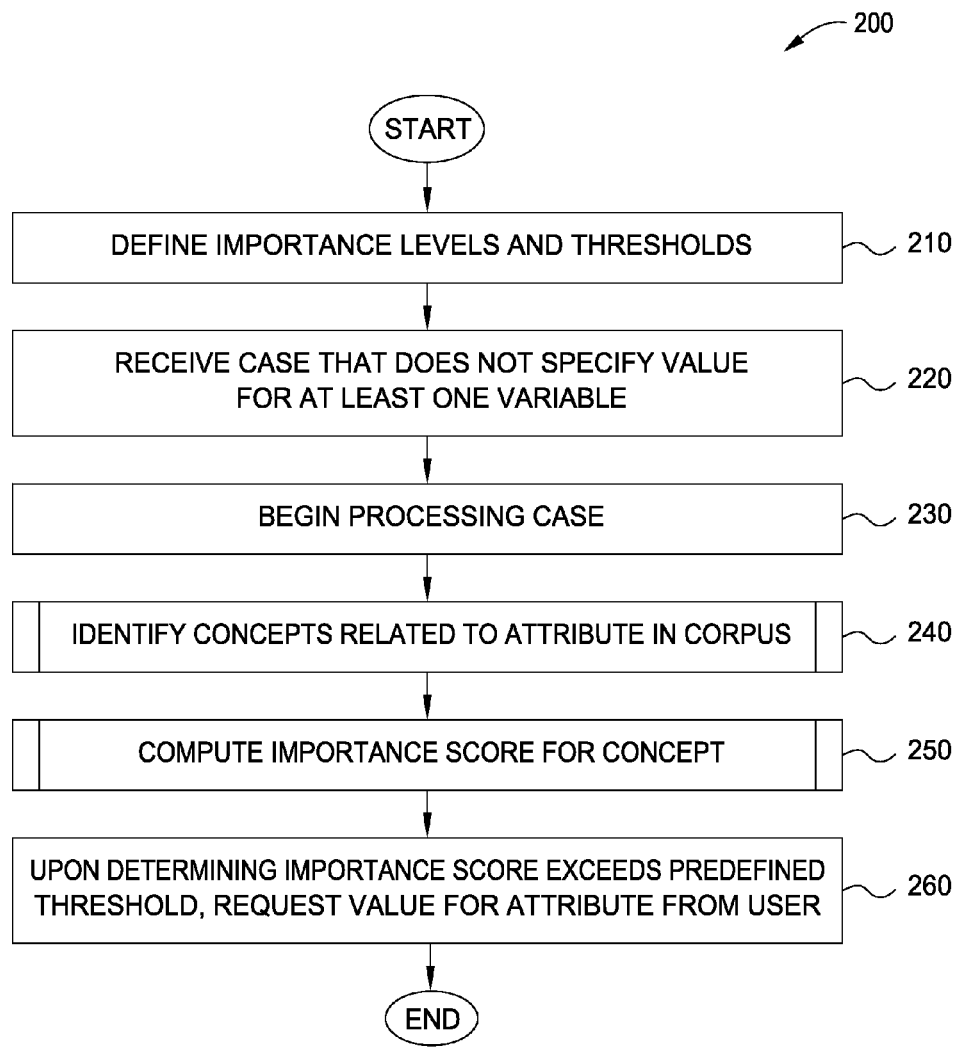
FIG. 2 illustrates a method to identify important attributes in a deep question answering system based on syntactic and semantic guidelines, according to one embodiment.

FIG. 2 illustrates a method 200 to identify important attributes in a deep question answering system based on syntactic and semantic guidelines, according to one embodiment. At step 210, a user may define importance levels for attributes and thresholds and/or ranges for importance scores of the attributes computed by the QA application 112. For example, in a medical setting, the importance levels may include "contraindication," "warning," and "caution." In an insurance setting, the importance levels may include "audit," "risk," and "fraud." The importance score ranges may be based on both qualitative and quantitative measures.

At step 220, the QA application 112 receives a case that does not specify a value for at least one attribute. For example, a patient record in the case data 113 could omit a patient's age, weight, cholesterol levels, and the like. At step 230, the QA application 112 may generate a collection of candidate answers in response to the case. As part of the processing, at step 240, the QA application 112 may identify concepts related to an attribute in the corpus 114. For example, if the attribute is a patient's cholesterol, the QA application 112 may identify a passages from documents in the corpus related to this concept (i.e., passages showing values for cholesterol in training cases, passages of research relating outcomes for treatment of the case based on cholesterol levels. For example, a drug label could warn that the drug should not be provided to patients having cholesterol levels above a specified amount. The QA application 112 may then identify such a passage as having a topic of concept of "warning," related to a value for a cholesterol level attribute. Identifying concepts in the corpus 114 is described in greater detail below with reference to FIG. 3. At step 250, the QA application 112 computes an importance score for the concept identified at step 240. Continuing with the cholesterol example, the QA application 112 may compute an importance score for the patient's cholesterol level, relative to the case being processed by the QA system. If the QA application 112 determines that the importance score exceeds a specified threshold (or matches a specified level), at step 260, the QA application 112 may request a value for that attribute. For example, the QA application 112 may return a first response to the user along with an indication that the patient's cholesterol level is an important attribute. Provided a value for the missing attribute is received, the QA application 112 can re-process the case using the supplied cholesterol level. That is, the QA application 112 returns a second response to the case. The second response may have a higher confidence score than the confidence score of the first response, due to the (formerly) missing attribute being included as part of the case.

In another embodiment, the QA application 112 may order (or rank) a plurality of different attributes based on the respective importance score computed for each attribute. Therefore, if a user submits a case that has missing attributes, the QA application 112 may prompt the user to supply values for each missing attribute, with each attribute being ordered by importance score. By ordering the attributes by importance score, the QA application 112 may call the user's attention to the most important attributes by placing the most important attributes at the top of the list.

Figure 3:
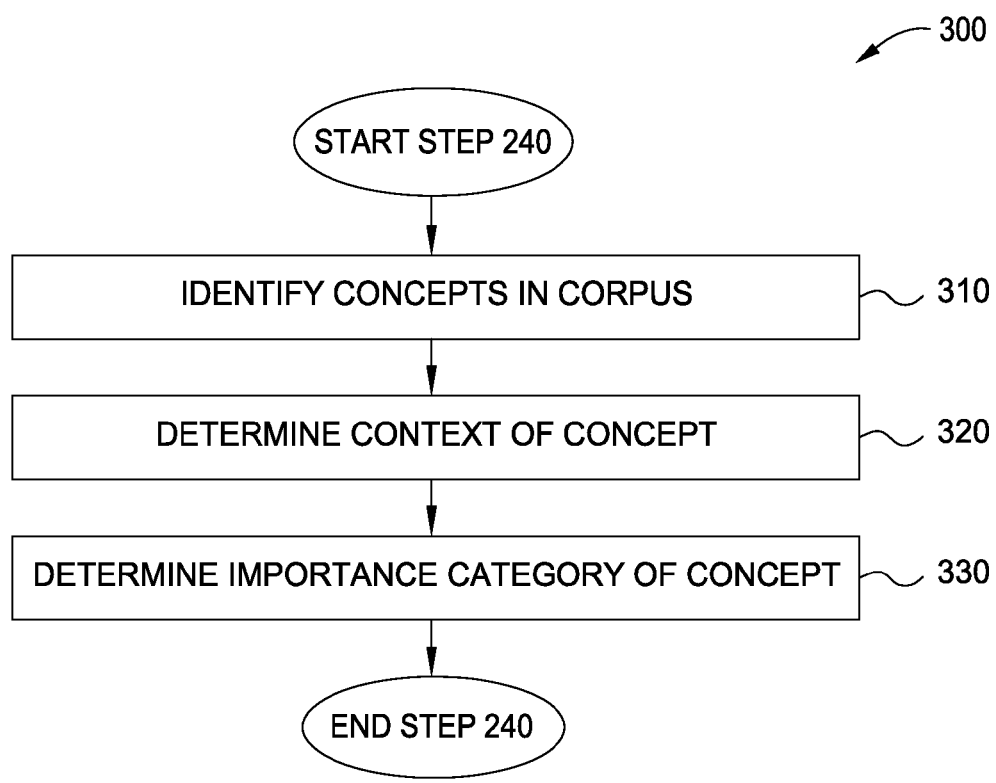
FIG. 3 illustrates a method to identify concepts related to attribute in a corpus of information, according to one embodiment.

FIG. 3 illustrates a method 300 corresponding to step 240, according to one embodiment. That is, FIG. 3 illustrates a method 300 to identify concepts related to attributes in a corpus of information. In at least one embodiment, the QA application 112 may perform the steps of the method 300 to identify attributes in the corpus 114 during a training phase. The QA application 112 may then store the identified important attributes in the importance data 115, allowing the QA application 112 to subsequently prompt for values for the important attributes omitted from a case, which may improve the "correctness" or accuracy of response returned for that case.

At step 310, the QA application 112 may perform natural language processing (NLP) on content in the corpus 114. In one embodiment, the QA application 112 may search for concepts matching a set of predefined concepts in the importance data 115. For example, if "contraindication" is a listed concept in the importance data 115, the QA application 112 may perform NLP on data in the corpus 114 to find instances of the concept contraindication. At step 320, the QA application 112 may determine a context of the concept. For example, the QA application 112 may identify a concept on a drug label that states "reduce dosage by 25% if bilirubin levels are higher than 1.5 times the upper limit of normal bilirubin levels." The QA application 112 may then determine that the quoted passage includes the concept of dosage reduction for patients having high bilirubin levels. Generally, the QA application 112 may analyze all aspects of the text of the drug label to determine the meaning and syntax of the concept. At step 330, the QA application 112 may determine the importance category of the concept. In some instances, the QA application 112 may match a term in the text to a concept category. For example, a concept may specifically mention an associated importance level, such as "warning, do not provide to children under 10 years old." In other instances, the QA application 112 may infer the importance level based on the context of the concept, where the concept does not match an express concept category. Such an example may include text specifying "not for minors under 10 years old." In some embodiments, the QA application 112 may store the identified importance category of the concept and the associated attribute in the importance data 115.

Figure 4:
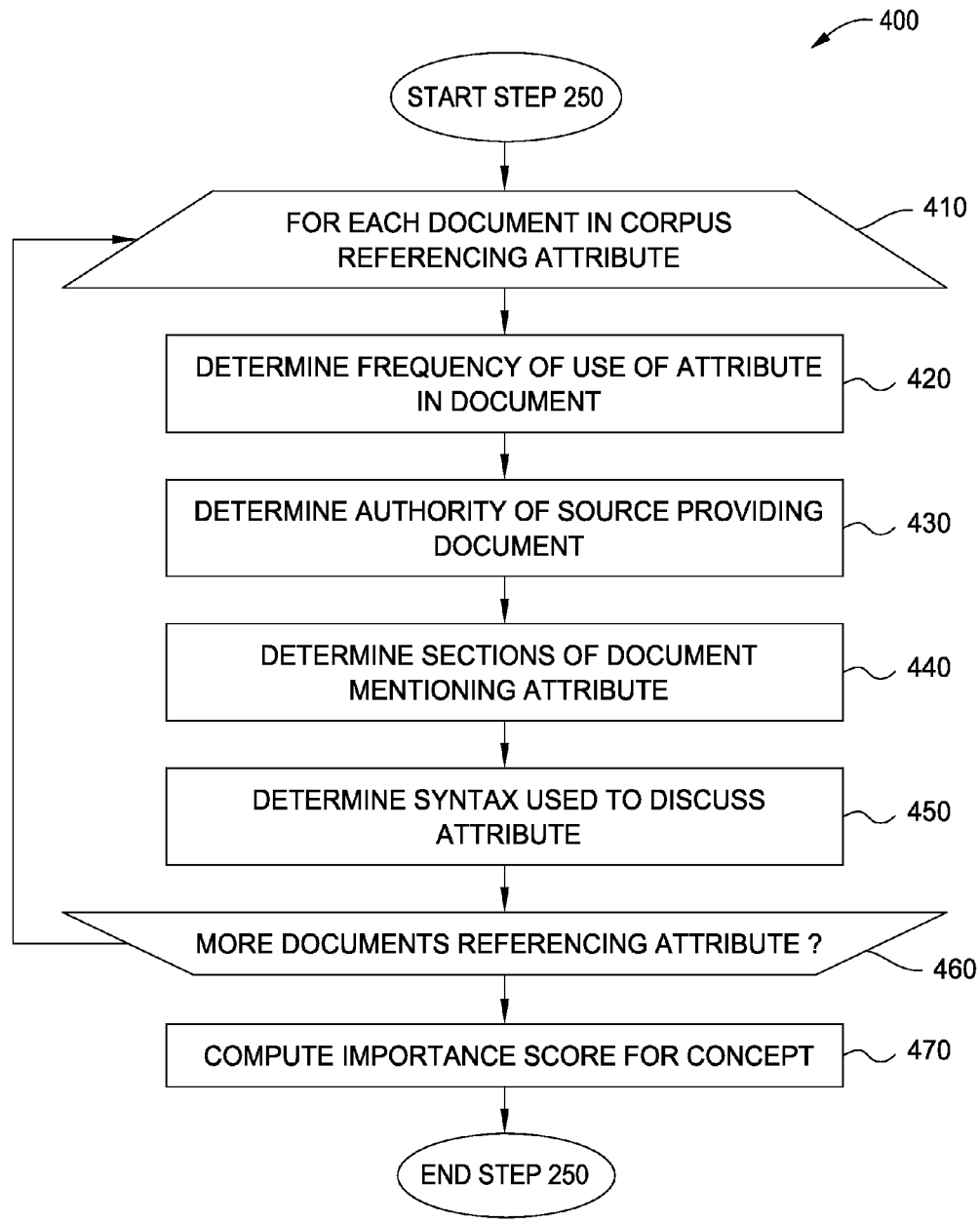
FIG. 4 illustrates a method to compute an importance score for an attribute, according to one embodiment.

FIG. 4 illustrates a method 400 corresponding to step 250, according to one embodiment. That is, FIG. 4 illustrates a method 400 to compute an importance score for an attribute. The QA application 112 may perform the steps of the method 400 to identify attributes that are of sufficient importance, such that the QA application 112 may request missing values for attributes that were not supplied as part of a case submitted to the QA application 112. As shown, method 400 begins at step 410, where the QA application 112 executes a loop including steps 420-460 for each document in the corpus 114 that references the attribute identified in the method 300. At step 420, the QA application 112 may determine the frequency of use of the attribute in the document. For example, a first document may mention a patient's age 40 times, while a second document mentions a patient's age one time. The QA application 112 may weight frequency of use in computing the score for the attribute, such that more frequently mentioned attributes result in a higher importance score for the attribute, and vice versa. At step 430, the QA application 112 may identify an authority of a source providing the document. For example, the first document may be published by a respected medical journal, while the second document may be a forum post in a health forum. The QA application 112 may weight the authority of the source when computing the importance score of the attribute. Doing so may allow the QA application 112 to weight more authoritative sources greater than less authoritative sources, more accurately reflecting the true importance of the attribute.

At step 440, the QA application 112 may determine which sections of the document mention the attribute. For example, the QA application 112 may weight a warning section more heavily than a summary section of a drug label. At step 450, the QA application 112 may determine the syntax used to discuss the attribute. Doing so may allow the QA application 112 to determine the importance of the attribute for each document discussing the attribute, as different documents may discuss each attribute in a different light. For example, the first document may state that treatment is contraindicated when a patient is taking a first drug, while a second document may state that the treatment is not affected when the patient is taking the first drug. At step 460, the QA application 112 may determine whether more documents remain that reference the attribute. If more documents remain in the corpus 114 that discuss the attribute, the QA application 112 may return to step 410. Otherwise, the QA application 112 may proceed to step 470, where the QA application 112 computes the importance score for the attribute. The QA application 112 may further determine the level for importance of the attribute based on the computed importance score. The QA application 112 may use any suitable algorithm to compute the importance score. The algorithm may weight each of the determinations made at steps 420-450 for each iteration of the loop to compute the importance score. Once the QA application 112 computes the importance score, the QA application 112 may store the computed importance score and associated importance level in a record for the attribute in the importance data 115.

Advantageously, embodiments disclosed herein provide deep question answering systems which identify attributes that are important to answering questions provided by users. By identifying these attributes, the deep question answering system may prompt users to supply values for the attributes (in the event the user did not provide a value). The deep question answering system may then re-process the question using the provided value to return a response having a higher confidence score than a response returned without using the value for the important attribute.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the QA application 112 could execute on a computing system in the cloud and identify important attributes in the corpus 114. In such a case, the QA application 112 could compute importance scores for the attributes and store the importance scores at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
   one or more computer processors; and
   a memory containing a program which when executed by the processors performs an operation comprising:
     analyzing, by a question answering (QA) system, a text of a plurality of documents in a corpus of information using natural language processing (NLP) to find instances of a plurality of predefined concepts associated with the corpus in the text of the plurality of documents;
     identifying, based on the analysis, a first concept of the plurality of concepts in the corpus;
     computing an importance score for a first attribute based on the first concept identified in the corpus, wherein the first concept is associated with the first attribute, wherein the corpus includes a plurality of references to the first attribute, and wherein the importance score is further based on a respective concept associated with each reference to the first attribute in the text of the plurality of documents in the corpus;
     determining that the corpus represents a first class of cases;
     upon determining that the importance score exceeds an importance threshold, determining that specifying a value for the first attribute increases confidence scores for responses to cases of the first class generated by the QA system beyond a confidence threshold;
     determining that a first case in the first class of cases does not specify a value for the first attribute;
     generating, by the QA system, a first response to the first case, wherein the first response is associated with a first confidence score;
     responsive to outputting a request to specify a value for the first attribute, receiving a value for the first attribute; and
     generating, by the QA system, a second response to the first case based in part on the value for the first attribute, wherein the second response is associated with a second confidence score that is greater than the first confidence score.

2. The system of claim 1, wherein the importance score is further based on: (i) a semantic meaning of the first concept, (ii) a publication source of documents in the corpus specifying the first concept, (iii) a category of the first concept, (iv) a number of occurrences of the first attribute in the text of the documents in the corpus, (v) a syntax of the concept, and (vi) a section of the text of documents in the corpus specifying the first attribute.

3. The system of claim 2, the operation further comprising:
   computing an importance score for a second attribute in the corpus based on a second concept in the corpus, wherein the second concept is associated with the second attribute and is identified based on the analysis;
   receiving a first case by the QA system, wherein the first case specifies a value for the first attribute, wherein the case does not specify a value for the second attribute;
   determining that the first case is of the first class of cases; and
   upon determining that the importance score for the second attribute does not exceed the importance threshold, returning, by the QA system, the response to the first case without the value for the second attribute.

4. The system of claim 3, wherein the importance score is computed responsive to receiving the first case by the QA system.

5. The system of claim 1, wherein the importance score is computed in a training phase of the QA system, wherein the confidence score specifies a level of confidence that the generated responses to cases of the first class are correct.

6. A computer program product, comprising:
   a non-transitory computer-readable storage medium having computer-readable program code embodied therewith, the computer-readable program code executable by one or more computer processors to perform an operation comprising:
     analyzing, by a question answering (QA) system, a text of a plurality of documents in a corpus of information using natural language processing (NLP) to find instances of a plurality of predefined concepts associated with the corpus in the text of the plurality of documents;
     identifying, based on the analysis, a first concept of the plurality of concepts in the corpus;
     computing an importance score for a first attribute based on the first concept identified in the corpus, wherein the first concept is associated with the first attribute, wherein the corpus includes a plurality of references to the first attribute, and wherein the importance score is further based on a respective concept associated with each reference to the first attribute in the text of the plurality of documents in the corpus;
     determining that the corpus represents a first class of cases;
     upon determining that the importance score exceeds an importance threshold, determining that specifying a value for the first attribute increases confidence scores for responses to cases of the first class generated by the QA system beyond a confidence threshold
     determining that a first case in the first class of cases does not specify a value for the first attribute;
     generating, by the QA system, a first response to the first case, wherein the first response is associated with a first confidence score;
     responsive to outputting a request to specify a value for the first attribute, receiving a value for the first attribute; and
     generating, by the QA system, a second response to the first case based in part on the value for the first attribute, wherein the second response is associated with a second confidence score that is greater than the first confidence score.

7. The computer program product of claim 6, wherein the importance score is further based on: (i) a semantic meaning of the first concept, (ii) a publication source of documents in the corpus specifying the first concept, (iii) a category of the first concept, (iv) a number of occurrences of the first attribute in the text of the documents in the corpus, (v) a syntax of the concept, and (vi) a section of the text of documents in the corpus specifying the first attribute.

8. The computer program product of claim 7, wherein the operation further comprises:
- computing an importance score for a second attribute in the corpus based on a second concept in the corpus, wherein the second concept is associated with the second attribute and is identified based on the analysis;
- receiving a first case by the QA system, wherein the first case specifies a value for the first attribute, wherein the case does not specify a value for the second attribute;
- determining that the first case is of the first class of cases; and
- upon determining that the importance score for the second attribute does not exceed the importance threshold, returning, by the QA system, the response to the first case without the value for the second attribute.

9. The computer program product of claim 8, wherein the importance score is computed in a training phase of the QA system, wherein the confidence score specifies a level of confidence that the generated responses to cases of the first class are correct.

\* \* \* \* \*